(12) United States Patent
Innami et al.

(10) Patent No.: US 6,987,236 B2
(45) Date of Patent: Jan. 17, 2006

(54) PLASMA POWDER WELDING DEVICE AND ITS WELDING METHOD

(75) Inventors: Tetsu Innami, Osaka (JP); Hiroyuki Kiso, Osaka (JP); Hideki Ihara, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 118 days.

(21) Appl. No.: 10/750,831

(22) Filed: Jan. 5, 2004

(65) Prior Publication Data

US 2004/0159640 A1 Aug. 19, 2004

(30) Foreign Application Priority Data

Jan. 6, 2003 (JP) ........................ 2003-000250

(51) Int. Cl.
*B23K 10/00* (2006.01)

(52) U.S. Cl. ............... 219/121.46; 219/121.47; 219/121.59; 219/76.16
(58) Field of Classification Search ............ 219/121.47, 219/121.52, 121.53, 121.45, 121.46, 121.59, 219/76.15, 76.16, 121.63, 121.64
See application file for complete search history.

(56) References Cited

U.S. PATENT DOCUMENTS 3,914,573 A  * 10/1975 Muehlberger ............ 219/76.16
4,866,240 A  * 9/1989 Webber ................. 219/121.47
5,584,433 A  * 12/1996 Nakagawa ..................... 239/8

FOREIGN PATENT DOCUMENTS

| EP | 0 129 402 | | 12/1984 |
|----|-----------|---|---------|
| FR | 2 082 025 | | 12/1971 |
| JP | 401162578 A | * | 6/1989 |
| JP | 7-099097 | | 4/1995 |
| JP | 8-300157 | | 11/1996 |
| JP | 11-277246 | | 10/1999 |
| WO | 01/72462 | | 10/2001 |

OTHER PUBLICATIONS

Patent Abstracts of Japan, vol. 1997, No. 03, Mar. 31, 1997 & JP 08 300157 A(Daido Steel Co., Ltd.), Nov. 19, 1996 * abstract; Figures 3,4 *.
Patent Abstracts of Japan, vol. 1995, No. 07, Aug. 31, 1995 & JP 07 099097 A(Nippon Uerudeingurotsuto KK), Apr. 11, 1995 * abstract * * paragraphs 0021, 0024, 0027, 0002 *.

* cited by examiner

*Primary Examiner*—Mark Paschall
(74) *Attorney, Agent, or Firm*—Wenderoth, Lind & Ponack, L.L.P.

(57) ABSTRACT

A plasma powder welding device in this invention comprises a powder having an identical kind of main component as that of a work piece, a feeder feeding the powder to the work piece, a welding torch generating a plasma between itself and the work piece for focusing the powder fed by the feeder on the work piece and transferring the powder to the work piece, and a power source supplying an electric power to the welding torch, wherein a distance from the welding torch to a focal point to which the powder is focused is set nearly equal to or more than the height of the torch.

8 Claims, 3 Drawing Sheets

FIG. 4 – PRIOR ART
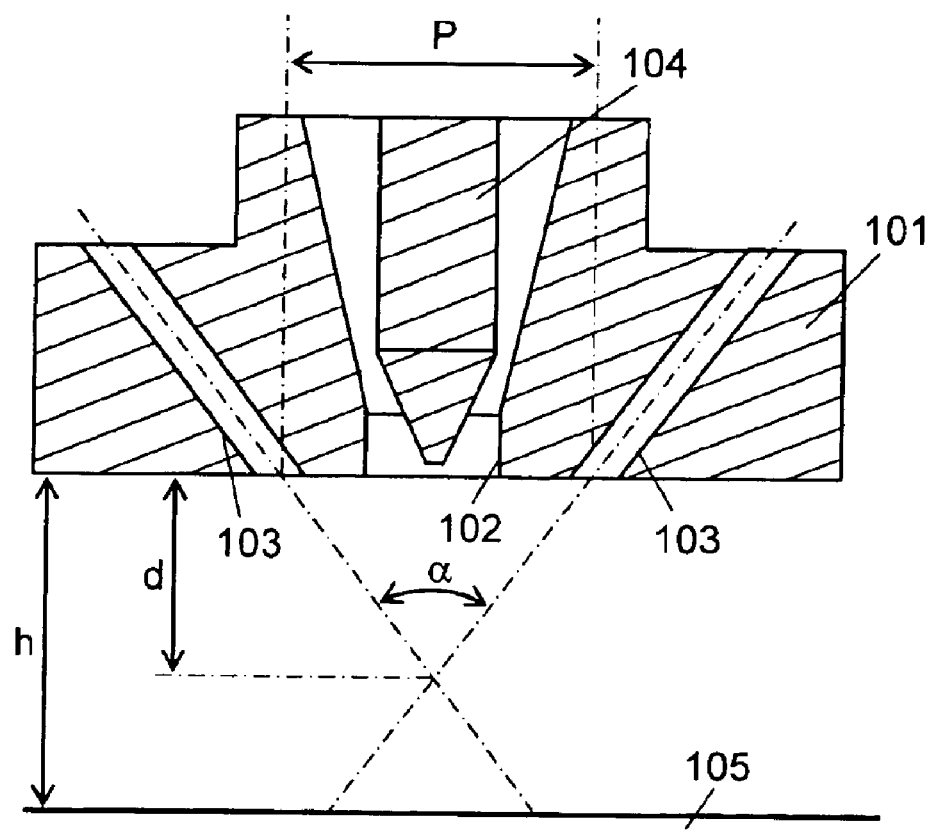

PLASMA POWDER WELDING DEVICE AND ITS WELDING METHOD

FIELD OF THE INVENTION

This invention relates to a plasma welding device for welding metallic material and a method of welding, using a powder as a filler material (hereinafter, called a plasma powder welding device and a plasma powder welding method).

BACKGROUND OF THE INVENTION

A plasma welding method, because of its high energy density, attains higher welding efficiency than what is allowed for a TIG welding method, and the welding quality is not any lower than that of the TIG welding. A plasma powder welding method has been widely used as a bead-welding method and a method for improving a surface quality of a work piece.

In a conventional method the powder used for the plasma powder welding includes a component which is different from a component of a work piece for securing a high wear-resistance, for instance. (Reference, as an example, is made to Japanese Patent Examined Publication No. H11-277246, pages 2 to 4 and FIG. 1). A torch is set at a large distance from the work piece, and focal length of jet of the powder is set shorter than the distance of the torch from the work piece. (Refer to Japanese Patent Examined Publication No. H8-300157 (pages 2 to 3, FIGS. 1 and 2), as an example).

FIG. 4 illustrates a relationship between a tip portion of a chip of a welding torch and a work piece, in the conventional plasma powder welding method. The plasma powder welding device includes chip 101, plasma nozzle 102, powder nozzle 103, electrode 104, and work piece 105. In FIG. 4, illustrated also are a distance 'h' of the torch from the work piece 105, a diameter of an imaginary circle 'P' configured by openings of the powder nozzles, an angle 'a' formed by intersecting axes of the powder nozzles, and a focal length 'd' of the intersection from the tip of chip 101.

Operation of the plasma powder welding method thus constituted will be explained next. A plasma arc is generated between electrode 104 and work piece 105 through plasma nozzle 102. Meanwhile a powder is ejected with a carrier gas through an opening portion of powder nozzle 103. The ejected powder is heated by the plasma arc and transferred to a surface of work piece 105. The distance 'h' of the torch from the work piece is set long in a range of 10 mm to 20 mm for preventing over melting of the work piece, and the focal length 'd', which is determined by a combination of the diameter of the imaginary circle 'P' and the angle at the intersection 'a', is set in a range of 50 to 60% of the distance 'h'. Thus, the ejected powder is first exposed to the plasma arc, and then dissolved by the heat to be deposited on work piece 105. With this arrangement, the powder is selectively dissolved and over melting of the work piece is controlled, thereby a component of the powder is prevented from being diluted with a component of the work piece when deposited on the surface of the work piece.

As described above, the conventional plasma powder welding method aims to deposit the powder having a different component from that of the work piece to the surface of the work piece, for improving the surface quality. For this purpose, melting of the work piece is controlled to a minimum so that the powder may not be diluted with a component of the work piece thereby losing its original composition, or being compounded with the work piece component to produce a deleterious substance. As a consequence, the conventional welding method is not appropriate for joining work pieces which require sufficient melting of the pieces.

SUMMARY OF THE INVENTION

A welding device is provided which includes a powder having the same main component as the work piece, a feeder supplying the powder to the work piece, a welding torch generating a plasma between itself and the work piece, focusing the powder supplied by the feeder on the work piece and transferring the powder to the work piece, a power source supplying electric power to the welding torch, in which a focal distance from the welding torch to a focal point of the powder is set equal to or longer than a distance from the work piece to the welding torch.

BRIEF DESCRIPTION OF THE DRAWINGS

FIG. 4 is a drawing illustrating a positional relationship between a cross-section of a conventional chip and a work piece.

DESCRIPTION OF THE PREFERED EMBODIMENT

Exemplary Embodiment

Figure 2:
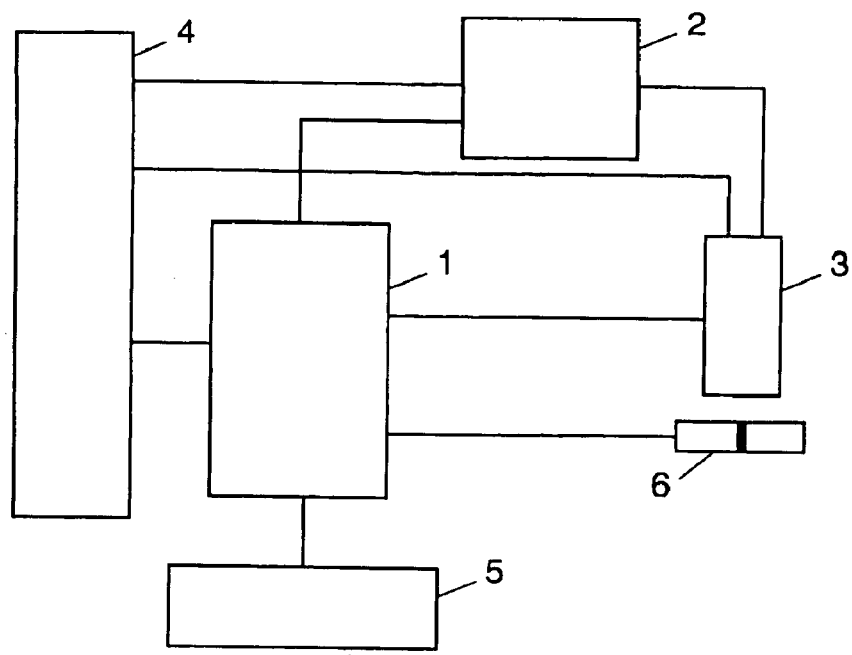
FIG. 2 is a block diagram of a device in accordance with the preferred embodiment of this invention.

FIG. 2 shows a plasma powder welding device including welding torch 3, power source 1 supplying electric power to welding torch 3, feeder 2 supplying a powder to welding torch 3, gas supplier 4 supplying a gas to feeder 2 and to welding torch 3, controller 5 outputting a predetermined signal to power source 1 and to feeder 2, and work piece 6. A working principle of the welding device thus constituted is explained next. Controller 5 outputs set values of welding conditions for welding i.e., an amount of plasma current and an amount of the powder to be fed, and a welding start up signal, to power source 1 and feeder 2. Feeder 2, based on the set value for the amount of the powder from controller 5, determines a level of feeding amount of the powder. Power source 1, based on the set value input by controller 5, determines an output level of the electric power to welding torch 3. Power source 1, upon receipt of the welding start up signal from controller 5, supplies the prescribed amount of the electric power to welding torch 3, and outputs ON signals to gas supplier 4 and feeder 2. Gas supplier 4, upon receipt of the ON signal, supplies a plasma gas to welding torch 3, and a carrier gas to feeder 2 for feeding the powder to welding torch 3. Feeder 2, upon receipt of the ON signal, feeds a prescribed amount of the powder to welding torch 3. Welding torch 3 generates a plasma arc between itself and work piece 6, keeps generating the arc, and blasts the powder toward the work piece.

Figure 1:
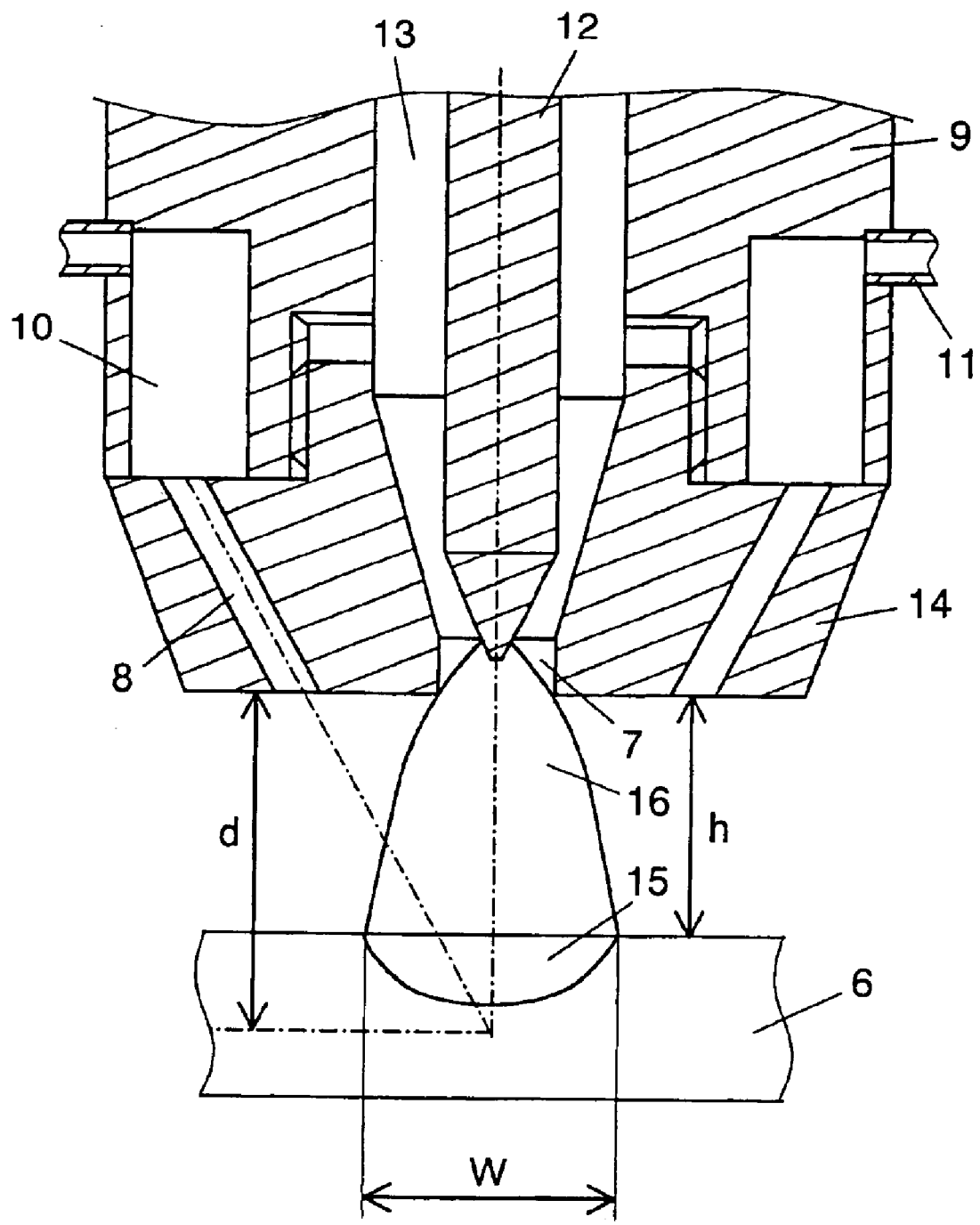
FIG. 1 is a drawing illustrating a positional relationship between a cross-sectional view of a tip portion of a chip and a work piece, in accordance with a preferred embodiment of this invention.

FIG. 1 shows details of a tip portion of welding torch 3, a relationship between the work piece 6 and a weld bead. As shown in FIG. 1, the plasma powder welding device includes chip 14, plasma nozzle 7 which shares a common central axis with electrode 12, and a plurality of powder nozzles 8 with each axis slanted from the axis of plasma nozzle 7 and are laid on an imaginary circumference of a concentric circle. Chip 14 is fixed to torch body 9 by being screwed thereto. Powder duct 11 connects feeder 2 and torch body 9. Powder chamber 10 is an annular recess, connected to an exit of the powder duct and opens to the tip portion of the torch body. Plasma gas path 13 rests between electrode 12 and torch body 9 and leads to plasma nozzle 7. Weld pool 15 is heated and melted by plasma arc 16. A width of the weld pool is indicated by 'W', a height of the torch i.e., a distance from work piece 6 to the tip of chip 14 is indicated by 'h', and a focal distance from the tip of chip 14 to a focal point where the axes of powder nozzles 9 and the axis of electrode 12 cross is indicated by 'd'.

Operation of this device is explained next. When electric power is supplied by power source 1, plasma arc 16 is generated between electrode 12 and work piece 16. Around plasma arc 16, a plasma gas is provided by gas feeder 4 through plasma gas path 13 and plasma nozzle 7. A pure argon gas is used in this case, but argon mixed with hydrogen, or argon mixed with helium, or non-oxide gas such as pure helium may be used. The plasma arc 16 is concentrated on a wall of plasma nozzle 7 with plasma gas, such that work piece 6 is melted within a zone of the width of the weld pool 'W'.

On the other hand, the powder is fed into powder chamber 10 of torch body 9 from feeder 2 through powder duct 11 by the carrier gas.

An effect of powder chamber 10 will be explained next. Because chip 14 is screwed to torch body 9, a positional relationship between powder nozzle 8 and torch body 9 becomes unstable. A purpose of the powder chamber 10 is to offer a countermeasure to this potential problem. If powder chamber 10 was not shaped as an annular recess but was a line of cylindrical holes along an imaginary periphery of the concentric circle as is the case with powder nozzles 8, powder nozzles 8 may not be correctly positioned with respect to powder chamber 10 depending on how the chip is screwed to the torch body, presumably resulting in the powder being not introduced to powder nozzles 8 but remaining in powder chamber 10. Powder chamber 10 is formed in the annular recess shape in order to avoid having the powder remain in the chamber as a result of positional discrepancy.

Because the axis of each powder nozzle 8 is positioned so as to be slanted relative to the axis of plasma nozzle 7, the powder blasted through powder nozzle 8 is focused at the focal distance 'd'.

A relationship between the focal distance 'd' and a distance (also referred to as a height of the torch) 'h' of this invention is explained next. An essential issue of this invention is how effectively energy of plasma arc 16 is applied to work piece 6 for welding a plurality of work pieces. To solve this issue, a fusing energy of plasma arc 16 which melts work piece 6 is utilized for melting and depositing the powder.

If the focal distance 'd' is shorter than the distance 'h', a large amount of the energy of plasma arc 16 is consumed for melting the powder fed into the plasma, and the fusing energy for work piece 6 is correspondingly reduced. This may cause insufficient fusing of the work pieces 6, and therefore, no welding of the pieces. Because of it, it is important to keep the focal distance 'd' longer than the distance 'h' so that plasma arc 16 can supply a sufficient amount of energy to work piece 6.

When a plurality of work pieces are welded, at least two work pieces of different component materials have to be employed and the pieces must be welded with a gap made between respective component materials.

The powder is meanwhile introduced to weld pool 15 which plasma arc 16 produced by melting work piece 6, deposited on weld pool 15 and forms the weld bead. For the powder to be effectively deposited, the focal distance 'd' must be set as the powder may be blasted within a zone 'W' the width of the weld pool. The width of the weld pool 'W' varies according to welding conditions such as the amount of plasma current, the distance 'h', and a speed of welding; therefore, an upper limit of the focal distance 'd' varies according to the conditions. When the width of the weld pool 'W' is large, efficiency of depositing the powder does not fall even if the focal distance 'd' is larger than the distance 'h'. However, when welding is made with a small current and the width of the pool 'W' is narrow, the focal distance 'd' has to be set close to the distance 'h' to maintain the efficiency of deposition of the powder. There are two methods for changing the focal distance 'd'; one is to replace torch body 9 and another is to replace chip 14, but replacing chip 14 is advantageous in terms of cost and replaceability.

Figure 3:
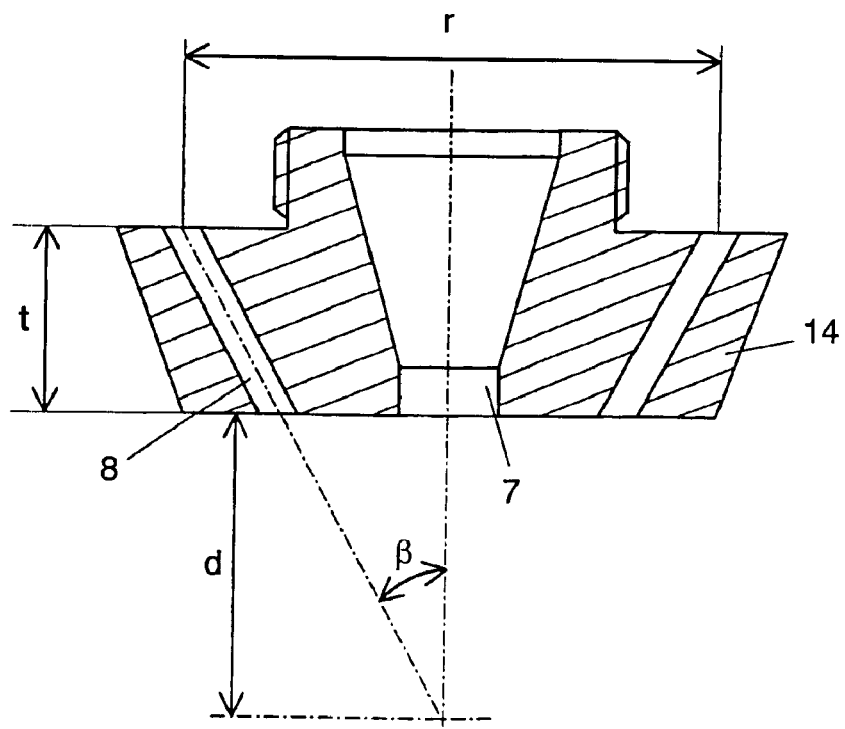
FIG. 3 is a cross-sectional view of a chip in accordance with the preferred embodiment of this invention.

FIG. 3 shows parameters in shapes of chip 14 in this embodiment differentiating the focal distance 'd'. In FIG. 3 the parameters of a chip thickness 't', an imaginary diameter 'r' of a circle configured by powder nozzles 8 on an imaginary circumference of the concentric circle, and a slanted angle 'β' of each powder nozzle 8 are shown. To alter the focal distance 'd', the parameters of the thickness of the chip 't', the diameter of the imaginary circle 'r', and the slanted angle 'β' are changed.

TABLE 1

| Diameter of imaginary circle (mm) | Thickness of chip (mm) | Angle of inclination, (°) | Focal distance (mm) | Height of applied torch (mm) |
|---|---|---|---|---|
| 26 | 8.0 | 45 | 5.0 | 5.0 |
| 22 | 4.0 | 45 | 7.0 | 5.0 |
| 26 | 4.0 | 45 | 9.0 | 5.0 |
| 26 | 8.6 | 35 | 10.0 | 10.0 |
| 26 | 4.6 | 35 | 14.0 | 10.0 |

Table 1 shows exemplary relationships of these parameters, between the shape of the chip and the obtained focal distances. The chips with a focal distance of 5, 7, and 10 mm are for a torch with a height of 5 mm. The chips with a focal distance of 10 and 14 mm are for a torch with a height of 10 mm. Every chip in these examples has eight powder nozzles 8 laid on the imaginary circumference of the circle spaced apart at 45° intervals. If non-uniformity of the blasted powder is considered, a larger number of the nozzles is more advantageous. If welding is made in a linear direction, one nozzle can be applied.

Table 2 shows examples of constituent components of the powder used to weld respective work pieces.

TABLE 2

| Kind of steel of work piece | Component of powder | | | | | |
|---|---|---|---|---|---|---|
| | C | Mn | Si | Ni | Cr | Mo | Others |
| SM490 | 0.02 | 1.30 | 0.51 | — | — | — | — |
| SUS304 | 0.05 | 0.61 | 0.21 | 10.5 | 20.4 | — | — |
| SUS316 | 0.04 | 0.33 | 0.25 | 13.2 | 19.3 | 2.49 | — |
| SUS430 | 0.05 | 0.46 | 0.43 | 0.18 | 18.7 | — | Nb 0.81 |
| SUS410 | 0.08 | 0.35 | 0.37 | 0.21 | 12.9 | — | — |

In this invention, the powder is alloyed with the melted piece material in weld pool 15, and the powder containing an identical component as that of the work piece is selectively contained so that the alloyed component may not deteriorate welding results. The powder containing the same component as that of the work piece is defined as the powder in which the same kind of component as that of the work piece is employed but the alloyed component does not cause the welding results to deteriorate.

Considering that some components are actually oxidized and consumed during the welding process, an amount of such component as Si and Mn is made larger for welding SM490 and Cr for stainless-steel than what is contained in the steel of the work piece. In SUS430, 0.81% of Nb is added to increase toughness of the welded portion in the metal. As these cases show, in making an alloy with the work piece, a component which is not contained in the work piece can be added to the powder for improving the welding performance as long as the alloyed component does not have an adverse affect.

As described, the present invention comprises the powder having the same kind of main component as that of the work piece, the feeder feeding the powder to the work piece, the welding torch generating the plasma between itself and the work piece for focusing the powder fed by the feeder on the work piece and transferring the powder to the work piece, and the power source supplying the electric power to the welding torch. By setting the distance from the welding torch to the focal point where the powder is focused equal to or more than the distance from the welding torch to the work piece, the powder and the work piece are simultaneously heated and a plurality of work pieces can be welded.

What is claimed is:

1. A welding arrangement comprising:

a powder having a constituent material;

a work piece having a constituent material the same as the constituent material of the powder;

a feeder for feeding the powder to the work piece; and a welding torch having a plasma gas path for feeding plasma gas toward the work piece, an electrode for generating a plasma between the welding torch and the work piece, and powder nozzles for directing the powder fed by the feeder toward a focal point and transferring the powder to the work piece, said focal point being defined at an intersection of axes of the powder nozzles and an axis of the plasma gas path;

wherein a distance from the welding torch to said focal point is longer than a distance from the welding torch to the work piece, so that said focal point is located in an interior of the work piece.

2. The welding arrangement according to claim 1, further comprising a power source for supplying electric power to the welding torch.

3. The welding arrangement according to claim 1, wherein said welding torch comprises a torch body and a chip fixed to said torch body.

4. The welding arrangement according to claim 3, wherein said plasma gas path, said electrode and said powder nozzles are each at least partly provided in said chip of said welding torch.

5. A welding method comprising:

providing a powder having a constituent material;

providing a work piece having a constituent material the same as the constituent material of the powder;

feeding the powder to the work piece;

providing a welding torch having a plasma gas path, an electrode and powder nozzles, and situating said welding torch and said work piece relative to each other;

operating said welding torch by feeding plasma gas toward the work piece via said plasma gas path, generating a plasma between the welding torch and the work piece via said electrode, and directing the powder fed to the workpiece toward a focal point and transferring the powder to the work piece via said powder nozzles, said focal point being defined at an intersection of axes of the powder nozzles and an axis of the plasma gas path;

wherein, in situating said welding torch and said work piece relative to each other, a distance from the welding torch to said focal point is made longer than a distance from the welding torch to the work piece, so that said focal point is located in an interior of the work piece.

6. The welding method according to claim 5, wherein said providing of said welding torch comprises providing a torch body and providing a chip, and fixing said chip to said torch body.

7. The welding method according to claim 6, wherein said providing of said welding torch comprises providing each of said plasma gas path, said electrode and said powder nozzles at least partly in said chip of said welding torch.

8. The welding method according to claim 6, wherein said fixing of said chip to said torch body comprises screwing said chip to said torch body.

* * * * *